(12) United States Patent
Hiraoka

(10) Patent No.: US 7,620,022 B2
(45) Date of Patent: Nov. 17, 2009

(54) TDMA COMMUNICATIONS APPARATUS

(75) Inventor: Yasushi Hiraoka, Nishinomiya (JP)

(73) Assignee: Furuno Electric Company Limited, Nishinomiya (JP)

( * ) Notice: Subject to any disclaimer, the term of this patent is extended or adjusted under 35 U.S.C. 154(b) by 304 days.

(21) Appl. No.: 11/287,401

(22) Filed: Nov. 28, 2005

(65) Prior Publication Data

US 2006/0114862 A1    Jun. 1, 2006

(30) Foreign Application Priority Data

Nov. 26, 2004  (JP)  ............................. 2004-342860

(51) Int. Cl.
*H04J 3/00* (2006.01)
(52) U.S. Cl. .................. 370/337; 370/236; 370/319; 370/321; 370/322; 370/347; 455/450; 455/451; 455/452.1; 455/452.2
(58) Field of Classification Search ................ 370/319, 370/321, 322, 236, 337, 341; 455/450, 451, 455/452.1, 453.1
See application file for complete search history.

(56) References Cited

U.S. PATENT DOCUMENTS

| 4,891,805 | A | * | 1/1990 | Fallin | 370/229 |
| 5,187,707 | A | * | 2/1993 | Chu et al. | 370/236 |
| 5,594,727 | A | * | 1/1997 | Kolbenson et al. | 370/442 |
| 5,673,253 | A | * | 9/1997 | Shaffer | 370/229 |
| 5,719,868 | A | * | 2/1998 | Young | 370/436 |
| 6,459,681 | B1 | * | 10/2002 | Oliva | 370/232 |
| 6,944,148 | B1 | * | 9/2005 | Gehring et al. | 370/347 |
| 7,006,530 | B2 | * | 2/2006 | Spinar et al. | 370/468 |
| 7,082,111 | B2 | * | 7/2006 | Amouris | 370/321 |
| 2004/0120322 | A1 | * | 6/2004 | Wu | 370/395.4 |
| 2004/0174895 | A1 | | 9/2004 | Hiraoka et al. | |

FOREIGN PATENT DOCUMENTS

GB       2400775        10/2004
JP       2003-57579 A    2/2003

* cited by examiner

*Primary Examiner*—Stephen M D'Agosta
(74) *Attorney, Agent, or Firm*—Birch, Stewart, Kolasch & Birch, LLP

(57) ABSTRACT

A CPU of a TDMA communications apparatus examines whether a slot to be allocated for a next transmission is a first slot (S1). If the slot to be allocated is the first slot, the CPU examines whether there are any slots already allocated by other stations within a Selection Interval SI in a frame in which the next transmission of own station is to be allocated referring to a slot map in a memory and finds out a free slot within Selection Interval SI (S11). Then, the CPU allocates the free slot as a next transmit slot of the own station and sets the slot number of the free slot as the slot number of the next transmit slot (S12). Then, the CPU examines whether a slot adjacent to the next transmit slot of the own station is allocated to any of the other stations (S13). If either of the slots adjacent to the next transmit slot of the own station is already allocated to another station, the CPU examines a time-out value set by that station for the adjacent slot (S15) and sets an initial time-out value differing from the time-out value set by the other station for the adjacent slot (S16).

7 Claims, 6 Drawing Sheets

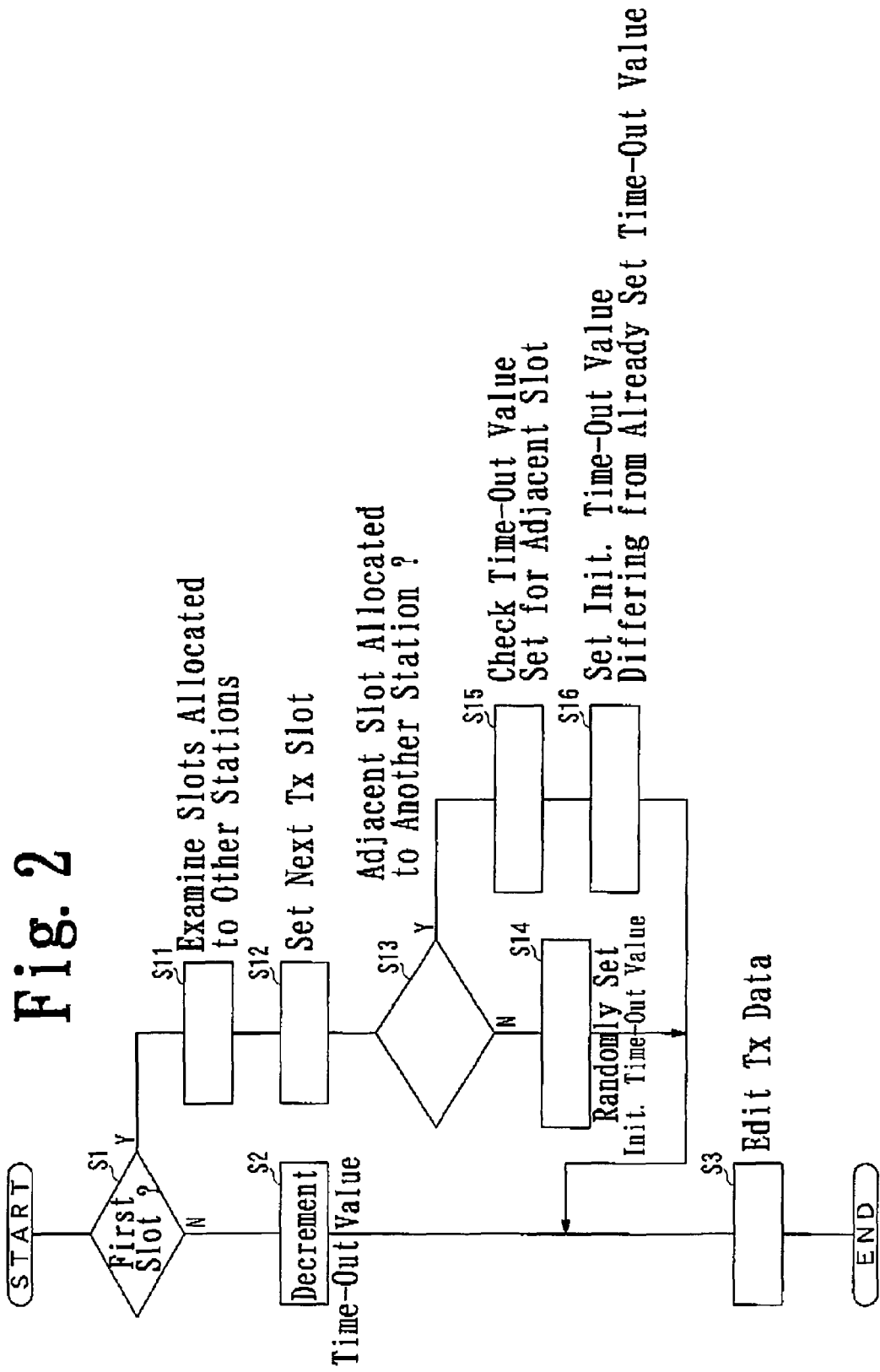

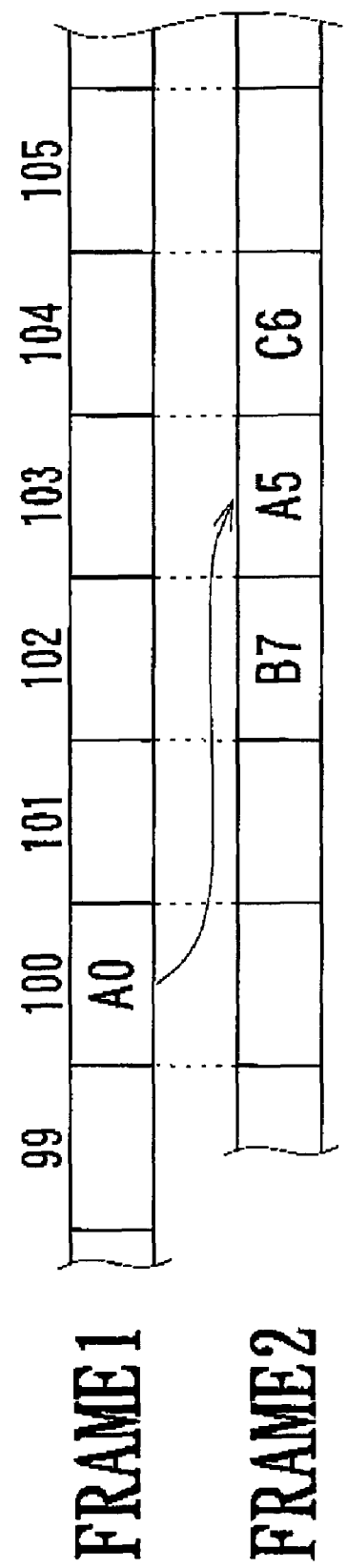

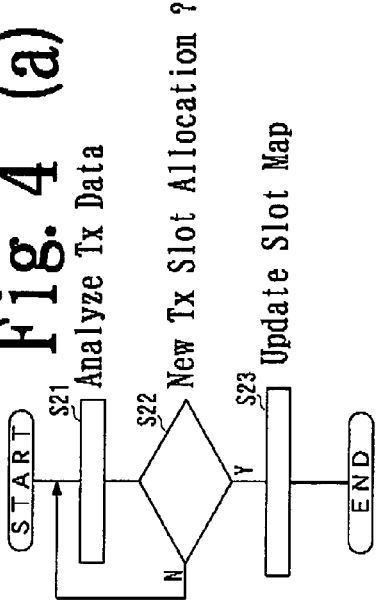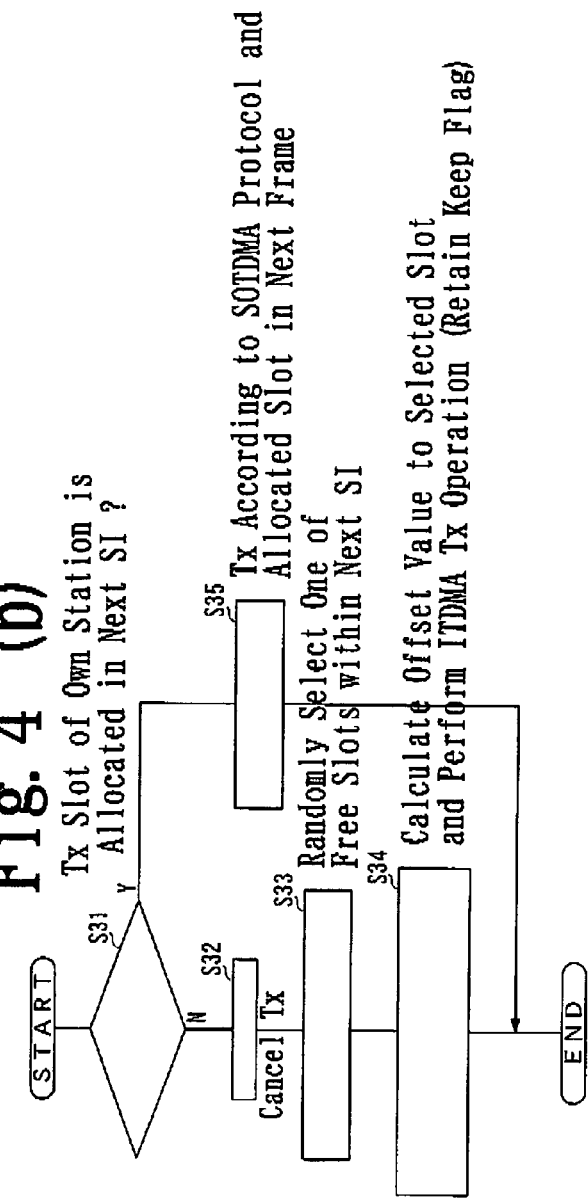

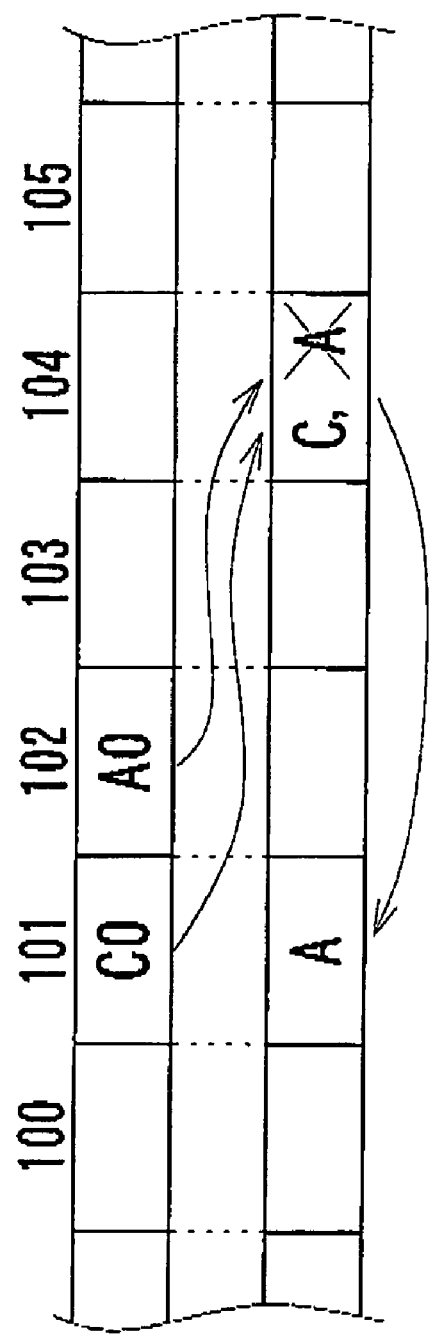

TDMA COMMUNICATIONS APPARATUS

BACKGROUND OF THE INVENTION

1. Field of the Invention

The present invention relates generally to a Time Division Multiple Access (TDMA) communications apparatus for performing TDMA communication in which each frame is divided into a plurality of time slots and every participating station transmits information in allocated slots. More particularly, the invention pertains to slot allocation for a TDMA communications apparatus.

2. Description of the Related Art

In a TDMA communication system, each successive frame is divided into a plurality of time slots based on a common time reference (time base) obtained from the global positioning system (GPS), for example, according to a prescribed time division scheme to thereby establish accurate slot synchronization among a plurality of participating stations (e.g. mobile units such as ships). The participating stations carry out TDMA communication while reserving (allocating) slots for their own transmission of information and messages. In this kind of communication system, such as the Universal Automatic Identification System (UAIS), it is essential for every participating station to communicate data in accordance with a defined protocol. To enable proper slot allocation for transmission of information and messages by multiple stations in the UAIS, international and national standards set out detailed technical operational rules and specifications including Self-Organized Time Division Multiple Access (SOTDMA).

Each time a participating station transmits a message (data) in an allocated time slot, the station also announces a slot number indicating a time slot to be reserved for future use (next transmission) by the same station according to SOTDMA protocol. This enables each station to know scheduled future transmissions, or allocated slot numbers for future use, by other participating stations, so that the occurrence of transmit slot allocation conflicts could be avoided.

When transmitting a message in a slot in a particular frame, a participating station can announce a time-out value together with a slot number to be reserved for future transmissions. The time-out value thus announced, which is normally selected from a range of "3" to "7", is a preliminary indication of the station's intention to use the same slot in several frames succeeding to the current frame. Provided that one station selects and announces a time-out value "4" when transmitting a message in a particular slot in the current frame, for example, that station successively reserves the same slot in the four succeeding frames while decrementing the time-out value from "4" to "3", "21", "1" and "0". More specifically, if the station has announced the time-out value "4" when transmitting a message in a slot in a first frame, the station announces the time-out value "3" and definitely reserves the same slot in a third frame when transmitting a message in a second frame. Next, the station announces the time-out value "2", and definitely reserves the same slot in a fourth frame when transmitting a message in the third frame. Then, the station announces the time-out value "1" and definitely reserves the same slot in a fifth frame when transmitting a message in the fourth frame. Finally, the station announces the time-out value "0" when transmitting a message in the fifth frame.

In the aforementioned slot allocation scheme of the SOTDMA protocol, a TDMA communications apparatus preliminarily reserves, or pre-reserves, the same slot in as many successive frames as specified by the time-out value and definitely reserves, or allocates, that slot at a point of transmission in the slot in each successive frame while decrementing the time-out value by 1. As the TDMA communications apparatus of each station decrements the time-out value one by one in this fashion, all other stations can recognize for how many frames the relevant slot should not be allocated for their own use referring to the time-out value transmitted from that TDMA communications apparatus. If the time-out value of one station is "3" in a particular slot in a current frame, for example, the other stations should refrain from allocating that slot for their own use for consecutive four frames including the current frame. At a point in time when the time-out value has reached a specific value ("0" in the above discussion), the TDMA communications apparatus selects and announces a desired slot number specifying a slot to be pre-preserved for future transmissions and announces that slot number together with a new time-out value when transmitting a message as described in Japanese Patent Application Publication No. 2003-057579, for example.

According to the SOTDMA protocol currently used in the UAIS system, however, there is a possibility that a transmit slot allocation conflict (overlapping of allocated slots) may occur even when a sufficient number of unreserved slots are available and conditions for radio communication are favorable. Such a slot allocation conflict situation is explained below more specifically, by way of example.

FIG. 6 is an explanatory diagram showing a transmit slot allocation conflict which can occur under the currently used SOTDMA protocol.

Referring to FIG. 6, if station A and station B transmits in two successive slots (e.g., slot No. 100 and slot No. 101) in a particular frame and the time-out value reaches a specific value ("0" in a case where the time-out value is decremented from one frame to the next as stated above) on both stations A, B in the same frame, there is a possibility that a slot number specifying a slot to be pre-preserved for future transmissions by station A coincides (conflicts) with a slot number specifying a slot to be pre-preserved for future transmissions by station B.

More specifically, in order to transmit in slot No. 100, a transmitter section of station A edits a transmit message including a slot number (slot No. 99 in frame c as illustrated in FIG. 6) to be pre-preserved for future transmissions and a time-out value. Then, station A transmits the message to station B and other participating stations in slot No. 100.

On the other hand, a receiver section of station B receives the message transmitted by station A in slot No. 100 and analyzes the message in slot No. 101. Therefore, station B recognizes the next slot number (slot No. 99 in frame c as illustrated in FIG. 6) to be allocated to station A at a point in time in slot No. 101. In order to transmit in slot No. 101, a transmitter section of station B edits a transmit message including a slot number (slot No. 99 in frame c as illustrated in FIG. 6) to be pre-preserved for future transmissions and a time-out value. Then, station B transmits the message the other participating stations in slot No. 101.

It will be understood from the above discussion that station B may select and announce a slot number (slot No. 99 in frame c as illustrated in FIG. 6) specifying the slot to be pre-preserved for future transmissions before knowing that station A has pre-preserved the same slot for future transmissions. Should such a situation occur, the slot number allocated to station A conflicts with the slot number allocated to station B.

SUMMARY OF THE INVENTION

In view of the foregoing, it is an object of the invention to provide a TDMA communications apparatus which can prevent transmit slot allocation conflicts in a reliable fashion.

According to the invention, a TDMA communications apparatus carries out communication using TDMA technology in which a frame is divided into a plurality of slots in accordance with a prescribed time division scheme, each station transmits in the same slot allocated in as many successive frames as specified by a time-out value which is decremented by 1 from one frame to the next, and each station reserves a new slot for future transmissions together with an initial time-out value at a point in time when a previously set time-out value reaches a specific value. The TDMA communications apparatus includes time-out value setting means for detecting a time-out value set by any other station for either of slots adjacent to the slot of own station to be allocated and for setting the initial time-out value at a value differing from the detected time-out value of the other station for the slot of the own station to be allocated at a point in time when the own station reserves the new slot.

The TDMA communications apparatus thus structured examines whether transmit slots adjacent to a transmit slot to be pre-reserved for future transmissions by the own station are pre-reserved by any of other stations when the own station is going to set a slot number specifying the transmit slot to be pre-reserved. If either of the transmit slots adjacent to the transmit slot to be pre-reserved for own use is pre-reserved by any of the other stations, the TDMA communications apparatus finds out the time-out value set for each of the adjacent transmit slots. Then, the TDMA communications apparatus sets for own future transmissions an initial time-out value different from the time-out value set by any of the other stations and transmits the initial time-out value together with the slot number specifying the transmit slot to be pre-reserved for the own station. If TDMA communication is carried out in autonomous and continuous mode in this form of transmit slot allocation scheme, the same time-out value is not set in three successive slots including the transmit slot to be pre-reserved for the own station and it is also possible to prevent two stations from reserving two successive slots for their future transmissions.

According to one feature of the invention, the TDMA communications apparatus further includes transmission stop means for canceling transmission in the newly reserved slot if the transmission stop means detects that the time-out value set by the other station for a slot adjacent to the slot of own station to be allocated has reached the aforementioned specific value in a slot in which the time-out value of the own station has also reached the specific value and further detects in a succeeding slot that the slot newly reserved by the own station for future transmissions coincides with a slot newly reserved by the other station of which time-out value has reached the same specific value.

In the TDMA communications apparatus thus structured, the transmission stop means cancels transmission in the newly reserved slot if the transmission stop means detects that the time-out value set by the other station for a slot adjacent to the slot of own station to be allocated has reached the aforementioned specific value in a slot in which the time-out value of the own station has also reached the specific value and further detects in a succeeding slot that the slot newly reserved by the own station for future transmissions coincides with a slot newly reserved by the other station of which time-out value has reached the same specific value. This serves to prevent transmit slot allocation conflict even when the same transmit slot is reserved by the own station and another station.

According to another feature of the invention, the time-out value setting means resets the time-out value of the own station to the aforementioned specific value if the time-out value setting means detects that the time-out value set for the slot newly reserved by the own station coincides with the time-out value set by the other station for a newly reserved slot thereof adjacent to the slot of the own station to be allocated.

In the TDMA communications apparatus thus structured, the time-out value setting means resets the time-out value of the own station to the aforementioned specific value if the time-out value set for the slot newly reserved by the own station coincides with the time-out value set by the other station for a newly reserved slot thereof adjacent to the slot of the own station to be allocated even when the time-out value set by the own station is equal to the aforementioned specific value. According to this arrangement, even if another station reserves a slot adjacent to the slot reserved by the own station with the same time-out value as the own station after the own station has reserved a slot with a different time-out value set by another station, the time-out value setting means resets the time-out value of the own station. Thus, time-out values of two adjacent slots do not coincide with each other.

According to the present invention, time-out values of two stations which transmit in two successive slots do not simultaneously become the aforementioned specific value. Therefore, the two stations do not reserve their new transmit slots in the two successive slots and this prevents the two stations from reserving the same transmit slot for future transmissions in a reliable manner. Accordingly, the invention makes it possible to structure a TDMA communications apparatus which can carry out TDMA communication while preventing transmit slot allocation conflicts in a reliable fashion.

Even if the own station reserves a slot which will not cause a transmit slot allocation conflict with other stations, another station may forcibly reserve the same slot. Should such a situation occur, the TDMA communications apparatus of the invention detects this conflict situation and cancels transmission in the slot in which the conflict is expected to occur. Thus, the invention makes it possible to structure a TDMA communications apparatus which can prevent transmit slot allocation conflicts in a more reliable fashion.

These and other objects, features and advantages of the invention will become more apparent upon reading the following detailed description along with the accompanying drawings.

BRIEF DESCRIPTION OF THE DRAWINGS

FIG. 2 is a flowchart showing a conflict-preventing transmit slot allocation procedure;

FIG. 3 is a conceptual diagram of the conflict-preventing transmit slot allocation procedure;

FIG. 4A is a flowchart showing a procedure for updating a slot map upon receiving transmit data from another station;

FIG. 4B is a flowchart showing a procedure for preventing transmit slot conflicts;

FIG. 5 is a conceptual diagram of the procedure for preventing transmit slot conflicts.

DETAILED DESCRIPTION OF THE PREFERRED EMBODIMENTS OF THE INVENTION

Now, a TDMA communications apparatus according to a preferred embodiment of the present invention is described with reference to FIGS. 1 to 5.

The TDMA communications apparatus of the invention is of a type which operates in accordance with operating rules and procedures employed in a currently implemented TDMA communication system and, in the context of discussion throughout this Specification, the expression "a specific value (time-out value)" means the number "0".

Figure 1:
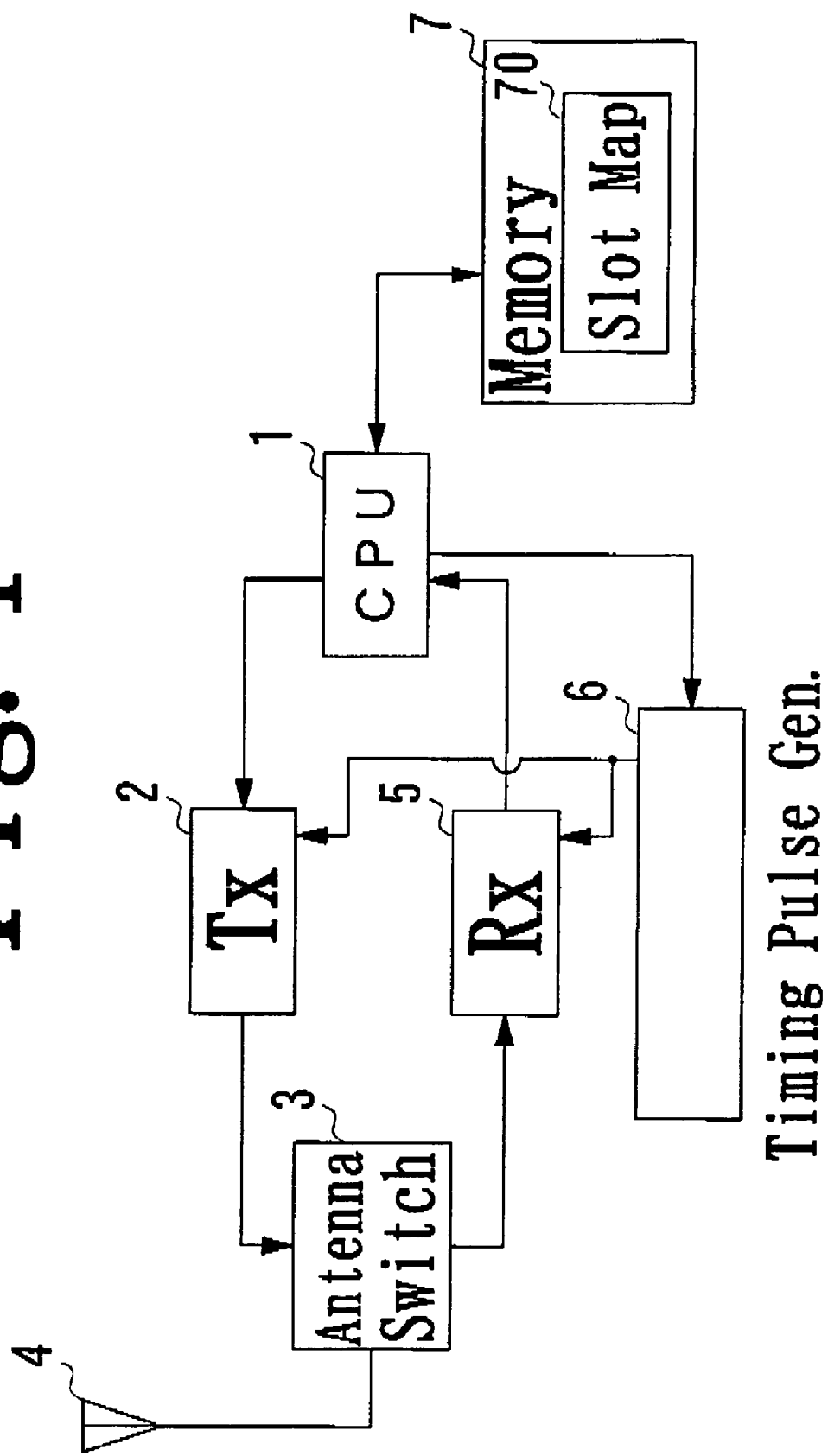
FIG. 1 is a general block diagram of a TDMA communications apparatus according to a preferred embodiment of the invention.

FIG. 1 is a general block diagram of the TDMA communications apparatus according to the embodiment of the invention.

A transmitter section 2 converts transmit data edited for own station by a central processing unit (CPU) 1 into a radio frequency (RF) transmit signal and outputs the RF transmit signal in accordance with a timing signal generated by a timing pulse generator 6.

The transmitter section 2 receives binary bit data from the CPU 1 with specific timing as will be later discussed, modulates a carrier containing binary bit data information by using a Gaussian Minimum Shift Keying Frequency Modulation (GMSK/FM) coding scheme, and amplifies and outputs a GMSK/FM-modulated signal to an antenna switch 3. The binary bit data is message data structured in accordance with a predefined format containing a body text of message including Maritime Mobile Service Identity (MMSI, or station number) and position information, a transmit slot number and next transmission allocation information. The next transmission allocation information includes message data indicating a protocol, such as SOTDMA or Incremental Time Division Multiple Access (ITDMA), and information according to the respective protocols.

Controlled by a transmit/receive switching signal fed from the CPU 1, the antenna switch 3 outputs the RF transmit signal delivered from the transmitter section 2 to an antenna 4 in a transmit slot and outputs an RF receive signal containing transmit data received by the antenna 4 from another participating station (other stations) to a receiver section 5. The antenna 4 transmits the RF transmit signal and receives the incoming RF receive signal.

The receiver section 5 demodulates and decodes the RF receive signal received by the antenna 4 and fed through the antenna switch 3 to acquire the transmit data sent from the other stations and delivers the transmit data to the CPU 1.

The CPU 1 outputs a timing control signal to be used for slot synchronization to the timing pulse generator 6 in accordance with a timing signal, such as a one pulse-per-second (1 PPS) signal fed from a global positioning system (GPS) receiver (not shown). The CPU 1 also analyzes the transmit data of the other stations fed from the receiver section 5 and, upon acquiring transmit data from a newly set reference station, performs frame synchronization by adjusting the own station's slot number in accordance with the reference station's slot number.

Under conditions where slot and frame synchronization has been accomplished in this fashion, the CPU 1 acquires from the transmit data of the other participating stations fed from the receiver section 5 a message and transmit slot allocation information sent from each of the other participating stations and writes the transmit slot allocation information thus acquired in a slot map 70 within a memory 7. Additionally, the CPU 1 configures transmit slot allocation information including a slot number specifying a transmit slot to be pre-reserved for future transmissions by the own station and a new time-out value (an initial time-out value in a case where a slot number is to be newly set) by a later-described procedure and edits transmit data of the own station containing the transmit slot allocation information and other pieces of information to be included in the own station's transmit message. The CPU 1 outputs this transmit data to the transmitter section 2 with proper timing for a predetermined transmit slot.

An integer defining the aforementioned initial time-out value is randomly selected from a range of "3" to "7" when a station sets (transmits) a slot number specifying a transmit slot to be pre-reserved for future transmissions. Then, priority is given to that station to use the pre-reserved transmit slot designated by the slot number for a period of as many successive frames as specified by the initial time-out value. Generally, the time-out value begins from the initial time-out value and is successively decremented by 1 from one frame to the next, or each time the TDMA communications apparatus transmits the RF transmit signal (transmit data). When the TDMA communications apparatus transmits the next time after the time-out value has reached "0", the TDMA communications apparatus sets a new slot number specifying a transmit slot to be pre-reserved for future transmissions and a new time-out value.

Each time the TDMA communications apparatus transmits, except when the time-out value has reached "0", the TDMA communications apparatus allocates for its own next transmission a transmit slot of the same slot number in a next frame as already pre-reserved. When the time-out value has reached "0", the TDMA communications apparatus sets a new slot number specifying a transmit slot to be pre-reserved for future transmissions together with a new time-out value specifying a particular number of succeeding frames which is predetermined within a specific period, or a Selection Interval (SI), in such a way that the slot number of the pre-reserved transmit slot will not conflict with those slot numbers which have been known to be already pre-reserved by other stations upon analyzing messages received from the other stations.

When setting a new slot number specifying a transmit slot to be pre-reserved for future transmissions, the CPU 1 examines whether transmit slots adjacent to the transmit slot to be pre-reserved for own use are pre-reserved by any of the other stations based on the transmit slot allocation information stored in the slot map 70 of the memory 7. If either of the transmit slots adjacent to the transmit slot to be pre-reserved for own use is pre-reserved by any of the other stations, the CPU 1 finds out the time-out value set for each such transmit slot pre-reserved by another station. Then, the CPU 1 sets for own future transmissions an initial time-out value different from the time-out value set by any of the other stations by selecting a proper integer from the aforementioned range of "3" to "7". This form of transmit slot allocation is hereinafter referred to as conflict-preventing transmit slot allocation scheme.

Even if the CPU 1 sets a time-out value for future transmissions by the own station by the aforementioned conflict-preventing transmit slot allocation scheme, however, another station may next pre-reserve a transmit slot adjacent to the transmit slot pre-reserved for use by the own station with the same time-out value. Should such a situation occur, the CPU 1 of the own station takes one of the following actions based on the transmit slot allocation information stored in the slot map 70 of the memory 7:

(1) The CPU 1 sets the time-out value of the own station to "0" and newly sets another slot number specifying a transmit slot to be pre-reserved for future transmissions, or (2) If the CPU 1 detects, when the time-out value of the own station has reached "0", that the time-out value set by another station for a transmit slot adjacent to the transmit slot of the own station to be allocated has reached "0" and further detects in a succeeding slot that a transmit slot newly pre-reserved by another station for future transmissions coincides with a transmit slot newly pre-reserved by the own station for future transmissions, the CPU 1 of the own station cancels transmission in the newly pre-reserved transmit slot.

The CPU 1 performing operations (1) and (2) above corresponds, respectively, to time-out value setting means and transmission stop means of claims appended to the present Specification of the invention.

Now, a procedure for preventing transmit slot number allocation conflicts and a procedure for preventing transmit slot conflicts are described specifically.

FIG. 2 is a flowchart showing a conflict-preventing transmit slot allocation procedure, and FIG. 3 is a conceptual diagram of the conflict-preventing transmit slot allocation procedure. In FIG. 3, numerals shown at the top indicates slot numbers of each frame, and alphanumeric symbols written in slots (shown by rectangles) each include a letter indicating a station and a number indicating a time-out value (or an initial time-out value), wherein "A" designates the own station and "B", "C", and so on designate other stations.

Referring to FIG. 2, when the own station is going to transmit a message containing edited transmit data, the CPU 1 of the TDMA communications apparatus of the embodiment examines whether a slot to be now allocated for a next transmission is a first slot (step S1). Here, the "first slot" means either a slot in which the own station actually transmits for the first time or a slot to be allocated after the time-out value has reached "0" in a preceding frame.

If the slot to be now allocated is not the first slot (No in step S1), the CPU 1 decrements the time-out value by 1 from that in the preceding frame (step S2) and generates, or edits, new transmit slot allocation information (step S3). If the slot to be now allocated is the first slot (Yes in step S1), on the other hand, the CPU 1 examines whether there are any slots already allocated for future transmissions by other stations within the Selection Interval SI in a frame in which the next transmission of the own station is to be allocated referring to the transmit slot allocation information stored in the slot map 70 of the memory 7 and finds out a free (or unreserved) slot within the Selection Interval SI (step S11). Then, the CPU 1 allocates the free slot as a next transmit slot of the own station and sets the slot number of the free slot as the slot number of the next transmit slot of the own station (step S12).

At this point, the CPU 1 examines whether a slot adjacent to the next transmit slot of the own station is allocated to any of the other stations (step S13). If neither of the slots adjacent to the next transmit slot of the own station is allocated to any other station, the CPU 1 randomly selects one of integers "3" to "7" and sets the selected integer as the initial time-out value (step S14). Then, the CPU 1 edits transmit data (step S3).

If either of the slots adjacent to (preceding and succeeding to) the next transmit slot of the own station is already allocated to any of the other stations, the CPU 1 examines the time-out value set by that station for the adjacent slot (step S15). Then, the CPU 1 of the TDMA communications apparatus of the own station sets an initial time-out value differing from the time-out value already set by the other station for the adjacent slot (step S16) and edits transmit data (step S3). If both slots adjacent to the next transmit slot of the own station are already allocated to two other stations, the CPU 1 of the own station sets an initial time-out value differing from the time-out values already set by the two other stations for both adjacent slots.

The aforementioned operating procedure of FIG. 2 is explained more particularly with reference to FIG. 3. If the own station is currently at slot No. 99 in frame 1 and is aware in advance of the fact that the time-out value set for a previously selected transmit slot of the own station becomes "0" at a point of transmission in slot No. 100 in the current frame 1, the CPU 1 of the TDMA communications apparatus of the own station finds out free slots from among slot Nos. 100 to 105 within the Selection Interval SI in frame 2 (steps S1, S11). The CPU 1 then selects slot No. 103 as a next transmit slot of the own station from among free slots 100, 101, 103, 105 thus found, for example, (step S12). Subsequently, the CPU 1 detects that slot No. 102 and slot No. 104 adjacent to slot No. 103 which has been selected as the next transmit slot of the own station (station A) are allocated to station B and station C and that time-out values "7" and "6" are set for slot No. 102 and slot No. 104, respectively, for example, (steps S13, S15). In this case, the CPU 1 of the own station sets an initial time-out value "5" differing from the time-out values "7" and "6" already set by stations B and C for the next transmit slot of the own station (step S16). Then, the CPU 1 edits transmit data (step S3) and transmits the same in slot No. 100 in the current frame 1. The other stations including stations B and C recognize that slot No. 103 in frame 2 has been allocated to station A for a next transmission by analyzing the transmit data received from station A in slot No. 100 in frame 1.

If TDMA communication is carried out in autonomous and continuous mode in accordance with the aforementioned operating procedure, the time-out value of the own station (station A) becomes "0" in a frame differing from a frame in which the time-out value of either of stations B and C becomes "0". Thus, the time-out values of multiple stations will not become "0" in successive slots of the same frame. This arrangement of the embodiment helps prevent different stations from newly allocating successive slots for future transmissions. The arrangement of the embodiment also helps prevent a station which is going to allocate a next transmit slot at a slot immediately succeeding to a transmit slot already allocated to another station from setting a slot number specifying the next transmit slot before recognizing the slot number of the transmit slot already allocated to the latter station. Consequently, the TDMA communications apparatus of the embodiment serves to prevent transmit slot allocation conflicts among multiple stations carrying out the TDMA communication.

Even if the TDMA communications apparatus of the own station allocates a next transmit slot by the aforementioned conflict-preventing transmit slot allocation procedure, however, there can occur a situation in which another station later allocates a transmit slot at a slot adjacent to the next transmit slot allocated by the own station with the same time-out value as the own station.

FIG. 4A is a flowchart showing a procedure for updating the slot map 70 upon receiving transmit data from another station.

When the TDMA communications apparatus of the own station receives transmit data from another station, the CPU 1 analyzes transmit slot allocation information contained in the received transmit data (step S21) and judges whether a new transmit slot allocation is included in the transmit slot allocation information (step S22). If a new transmit slot allocation is included is included, the CPU 1 updates the slot map 70 in the memory 7 by writing a slot number specifying a transmit slot to be allocated to that station (step S23).

If the CPU 1 detects that a new transmit slot has been allocated by another station with the same time-out value as the own station at a slot adjacent to the next transmit slot of the own station at this point, the CPU 1 of the own station resets the time-out value to "0" and newly allocates a next transmit slot.

If the time-out value set for neither of slots preceding and succeeding to the next transmit slot of the own station allocated is "0", the CPU 1 of the own station newly allocates a next transmit slot as discussed above. If the time-out value set by another station for one of the slots preceding and succeeding to the next transmit slot of the own station allocated is "0" and the time-out value set by the own station is not "0", however, the CPU 1 of the own station does not immediately resets the time-out value to "0" but normally decrements the time-out value for one or more frames and resets the time-out value of the own station to "0" upon confirming that neither of the slots preceding and succeeding to the next transmit slot of the own station allocated is "0".

Even if another station sets the same time-out value as the own station for a slot adjacent to the next transmit slot of the own station after the own station has set the time-out value, the own station sets a different time-out value anew by performing the aforementioned operating procedure. This arrangement of the embodiment helps prevent such a situation that the time-out value set by the own station and the time-out value set by another station become "0" in succession in two adjacent transmit slots. transmit slot already allocated to the latter station. Consequently, the TDMA communications apparatus of the embodiment serves to prevent transmit slot allocation conflicts among multiple stations in a more reliable fashion.

Even when the TDMA communications apparatus of the own station performs the above-described operations for avoiding transmit slot allocation conflicts, another station may set the same slot number as selected by the own station. Described specifically in the following is the aforementioned procedure for preventing transmit slot conflicts.

FIG. 4B is a flowchart showing the procedure for preventing transmit slot conflicts, and FIG. 5 is a conceptual diagram of the procedure for preventing transmit slot conflicts.

Each time the TDMA communications apparatus of the present embodiment receives transmit data from another station in the autonomous and continuous mode, the CPU 1 of the own station analyzes the received transmit data and, if a new transmit slot allocation is found in the received transmit data, the CPU 1 writes a slot number specifying a transmit slot to be allocated to that station in the slot map 70 stored in the memory 7 (steps S21, S22, S23) as already discussed with reference to FIG. 4A. In a frame in which the own station transmits, the CPU 1 examines whether a transmit slot of the own station is allocated within a next Selection Interval SI (step S31). If there is a transmit slot of the own station is allocated within a next Selection Interval SI (Yes in step S31), the CPU 1 causes the TDMA communications apparatus of the own station to transmit in the autonomous and continuous mode of the SOTDMA protocol and perform transmit slot allocation operation (step S35).

If there is no transmit slot of the own station is allocated within the next Selection Interval SI (No in step S31), or if the CPU 1 finds that a slot which the CPU 1 intended to allocate as a next transmit slot of the own station has just been allocated to another station, the CPU 1 cancels allocation of that slot (step S32).

In this case, to maintain a scheduled report rate, the CPU 1 randomly selects one of free slots available within the next Selection Interval SI in which the CPU 1 intended to allocate as a next transmit slot of the own station (step S33) and, then, the CPU 1 calculates an offset value to the selected slot and performs ITDMA transmit operation (step S34). As a result, the selected slot is reserved anew as the next transmit slot of the own station. At the same time, the CPU 1 can reserve the same slot in the next frame as in SOTDMA communication by maintaining a frame keep flag in an ON state (step S34).

The aforementioned operating procedure of FIG. 4B is explained more particularly with reference to FIG. 5. If both station C and station A (own station) allocate slot No. 104 in frame 2 for their future transmissions in two successive slot Nos. 101 and 102 in frame 1 as shown in FIG. 5, for example, transmit slot allocations of the two stations A, C conflict at slot No. 104 in frame 2. In this case, own station A cancels transmission in slot No. 104 of frame 2 in a Selection Interval SI immediately preceding a Selection Interval SI including slot No. 104 which own station A once allocated for its next transmission (step S32). Then, own station A re-allocates a free slot in frame 2, e.g., slot No. 101, as a next transmit slot (steps S33, S34).

The TDMA communications apparatus of the embodiment prevents transmit slot allocation conflicts by canceling transmission in a slot of the own station once allocated according to the above-described operating procedure when a conflict with a next transmit slot of another station is expected to occur. Furthermore, the TDMA communications apparatus of the embodiment can prevent the transmit slot allocation conflict by re-allocating a free slot within the same Selection Interval SI as the next transmit slot of the own station without changing the report rate.

Figure 6:
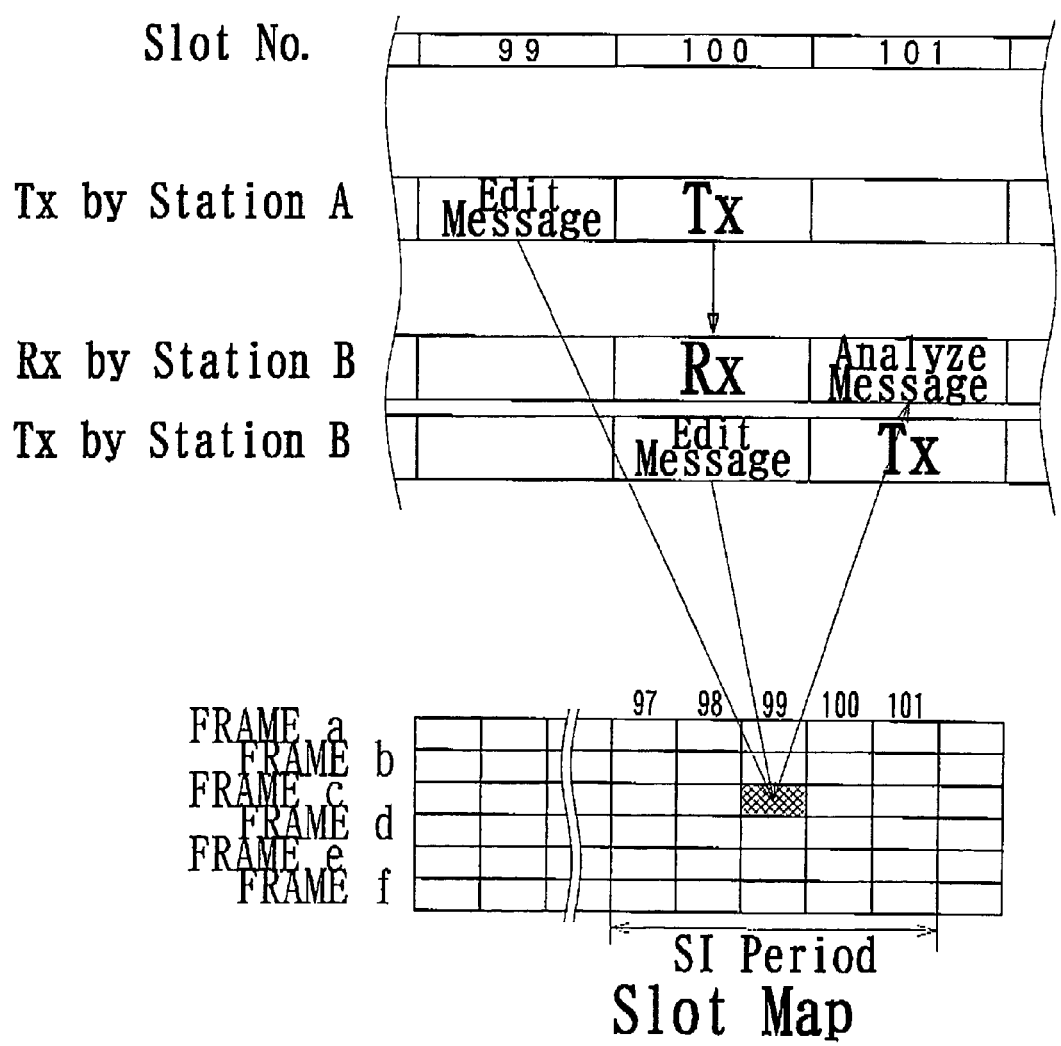
FIG. 6 is an explanatory diagram showing a transmit slot allocation conflict which can occur under a currently used SOTDMA protocol.

While the foregoing discussion of the invention has shown a case in which the TDMA communications apparatus edits a transmit message in a slot immediately preceding an allocated transmit slot of the own station as shown in FIG. 6, the invention is also applicable to a TDMA communications apparatus which edits a transmit message in a slot other than the slot immediately preceding the allocated transmit slot of the own station.

For example, if the CPU of the TDMA communications apparatus does not provide a sufficiently high throughput, the CPU can not edit a transmit message in a timely fashion within a slot immediately preceding an allocated transmit slot of the own station. In such a case, it is necessary for the CPU to begin editing a transmit message from a few slots earlier than the allocated transmit slot and, thus, the CPU should examine not only two slots preceding and succeeding to the next transmit slot of the own station allocated in a next frame but also a few slots preceding the next transmit slot and set a time-out value differing from time-out values already set by other stations.

What is claimed is:

1. A TDMA communications apparatus for carrying out communication using TDMA technology in which a frame is divided into a plurality of slots in accordance with a prescribed time division scheme, each station transmits in the same slot allocated in as many successive frames as specified by a time-out value which is decremented by 1 from one frame to the next, and each station reserves a new slot for future transmissions together with an initial time-out value at a point in time when a previously set time-out value reaches a specific value, said TDMA communications apparatus comprising:

a time-out value setting unit detecting a time-out value set by any other station for either of slots adjacent to the slot of own station to be allocated and setting the initial time-out value at a value differing from the detected time-out value of the other station for the slot of the own station to be allocated at a point in time when the own station reserves the new slot; and a transmission stop unit canceling transmission in the newly reserved slot if said transmission stop unit detects that the time-out value set by the other station for a slot adjacent to the slot of own station to be allocated has reached said specific value in a slot in which the time-out value of the own station has also reached said specific value and further detects in a succeeding slot that the slot newly reserved by the own station for future transmissions coincides with a slot newly reserved by the other station of which time-out value has reached said same specific value.

2. The TDMA communications apparatus according to claim 1, wherein said time-out value setting unit resets the time-out value of the own station to said specific value if said time-out value setting unit detects that the time-out value set for the slot newly reserved by the own station coincides with the time-out value set by the other station for a newly reserved slot thereof adjacent to the slot of the own station to be allocated.

3. The TDMA communications apparatus according to claim 1, wherein said time-out value setting unit resets the time-out value of the own station to said specific value if said time-out value setting unit detects that the time-out value set for the slot newly reserved by the own station coincides with the time-out value set by the other station for a newly reserved slot thereof adjacent to the slot of the own station to be allocated.

4. The TDMA communications apparatus according to claim 1, wherein the transmission stop unit canceling transmission in the new slot if said transmission stop unit detects that the time-out value set by the other station for a slot adjacent to the slot of own station to be allocated has reached said specific value in a slot and the time-out value of the own station has reached said specific value.

5. The TDMA communications apparatus according to claim 4, wherein said time-out value setting unit resets the time-out value of the own station to said specific value if said time-out value setting unit detects that the time-out value set for the slot newly reserved by the own station coincides with the time-out value set by the other station for a newly reserved slot thereof adjacent to the slot of the own station to be allocated.

6. The TDMA communications apparatus according to claim 1, wherein the transmission stop unit canceling transmission in the new slot if said transmission stop unit detects in a succeeding slot that the slot newly reserved by the own station for future transmissions coincides with a slot newly reserved by the other station.

7. The TDMA communications apparatus according to claim 6, wherein said time-out value setting unit resets the time-out value of the own station to said specific value if said time-out value setting unit detects that the time-out value set for the slot newly reserved by the own station coincides with the time-out value set by the other station for a newly reserved slot thereof adjacent to the slot of the own station to be allocated.

* * * * *